Feb. 21, 1933.    G. GARIBALDI    1,898,580
FUEL PREHEATER
Filed Jan. 6, 1930
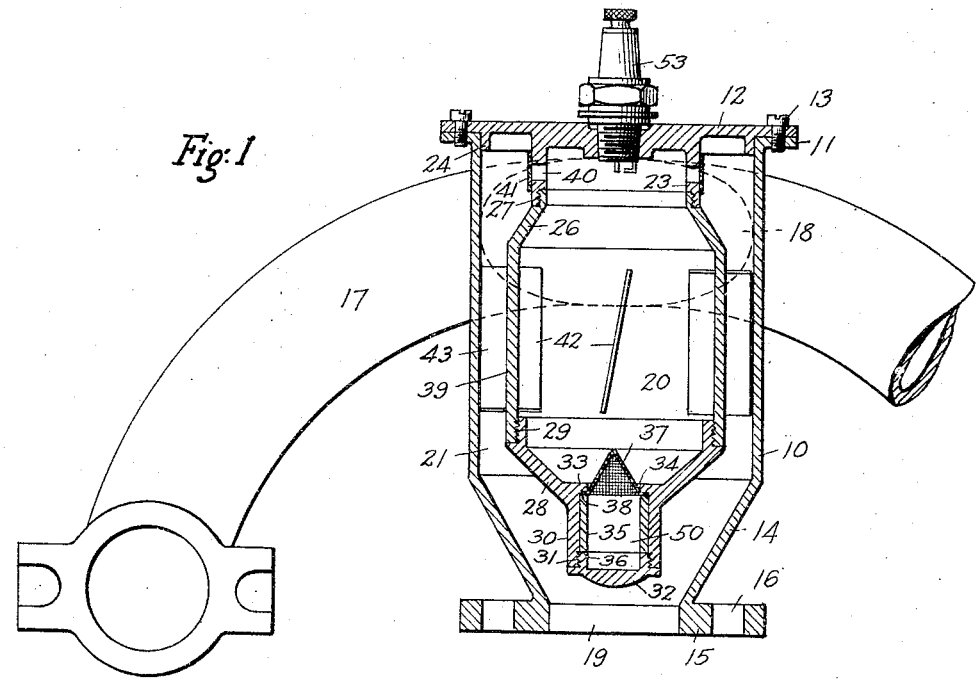
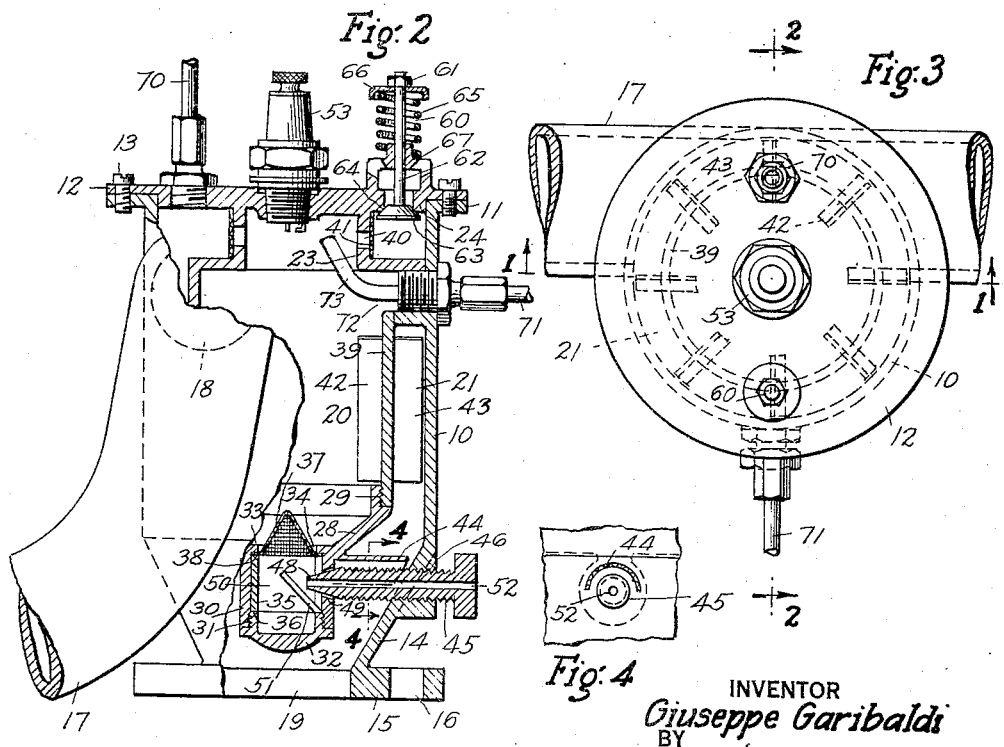
INVENTOR
*Giuseppe Garibaldi*
BY
ATTORNEY Patented Feb. 21, 1933

1,898,580

UNITED STATES PATENT OFFICE

GIUSEPPE GARIBALDI, OF STAMFORD, CONNECTICUT, ASSIGNOR TO FUEL OIL CARBURETION CO., INC., OF NEW YORK, N. Y., A CORPORATION OF NEW YORK

FUEL PREHEATER

Application filed January 6, 1930. Serial No. 418,739.

This invention relates to fuel preheating devices intended to make it possible to utilize low grade fuels such as furnace oil in engines of existing design and with standard forms of carburetors.

My invention contemplates the provision of a controlled heating means, for preheating the vapor and air stream fed to the engine, which means becomes effective immediately after the engine is started. My invention further contemplates the provision of simple and efficient means having a minimum number of parts and intended to be associated with the intake manifold of an engine and connecting the manifold with any of the conventional forms of carburetors, for not only preheating the fuel mixture, but also interposing air into the mixture when necessary to regulate the proportions thereof, and to inject priming fluid thereinto for starting purposes in accordance with my prior application for patent for fuel feed for internal combustion engines, Serial No. 304,971, filed September 10th, 1928, and Serial No. 410,363, filed November 29th, 1929.

My invention further contemplates the provision of a simple and inexpensive manifold and heating chamber designed for quick and easy assembly and disassembly and independent of a fluctuating source of heat such as exhaust gases or hot water jackets, and under control, for applying steady heat to the fuel mixture without interfering with the distribution of the fuel to the engine cylinders, and without obstruction of the free flow of the mixture from the carburetor outlet to the intake ports of the engine cylinders.

My invention further contemplates the provision of means for agitating the fuel mixture during the heating thereof and for diverting a quantity of fuel and regulating the supply of air and fuel so diverted and feeding it to the combustion chamber.

The various objects of my invention will be clear from the description which follows and from the drawing, in which Fig. 1 is a cross-section of my improved device taken on the line 1—1 of Fig. 3, as it appears associated with an intake manifold.

Fig. 2 is a side elevation of the same, partly in section, on the line 2—2 of Fig. 3, showing the priming means, the auxiliary air valve and the regulating needle for the combustion chamber.

Fig. 3 is a top plan view thereof, and

Fig. 4 is a vertical section taken on the line 4—4 of Fig. 3, of the hollow regulating needle and of the fuel diverting vane therefor.

In that practical embodiment of my invention which I have illustrated by way of example, I prefer to provide a casing 10 preferably provided with flanges as 11 at the upper end thereof, to which a suitable top or cover 12 may be removably secured, as by means of the screws 13. The lower end of the casing 10 is preferably tapered as at 14 and is provided with an inlet opening 19 and terminates in a suitable flange as 15 provided with bolt holes 16 whereby the casing may be removably secured to the outlet end of any suitable type of carburetor, fuel vaporizer or mixer to receive fuel therefrom through the opening 19. The intake manifold pipe 17 is connected to the casing 10 as at the opening 18 communicating with the interior of the casing and serves to conduct the heated mixture from said casing to the engine cylinders in a manner which will be explained more fully hereinafter, said casing 10 being in effect an enlargement of the manifold intermediate of the ends thereof.

A combustion chamber 20 for the burning of fuel diverted from the main fuel stream to supply heat is provided within the casing 10.

I prefer to form said chamber by arranging a heating and partition wall 39 concentrically of and inside the casing 10 and closing said wall at the ends thereof. An annular passage as 21, through which the fuel mixture passes on its way from the inlet 19 toward the outlet 18, leading to the manifold, is thereby formed by the partition wall. The partition wall is suitably secured to the top or cover 12 of the casing so that the entire wall together with the parts associated therewith may be removed together with the cover, for purposes of cleaning, inspection, replacement and repair. Said cover is provided with a depending flange as 24 adapted to fit snugly inside of the casing and serving to locate the cover in its place in the casing, and with a second annular depending flange as 23, arranged concentrically about the axis of the cover. Suitable gaskets, if desired, may be interposed between the cover and the flange 11 of the casing.

At the lower end of the flange 23 is arranged the partition wall 39, said wall being preferably tapered near its upper end as at 26, and being threaded as at 27 to engage the internal threads at the lowermost end of said flange 23, so that the wall may be removed from the cover if desired. The wall 39 carries at its lower end, the tapered screen supporting member 28, which is threaded to said wall as at 29 and forms the lower end of the combustion chamber 20, the remainder of which is formed by the flange 23 and the wall 39. Said member 28 preferably terminates in a cylindrical portion 30, internally threaded as at 31 for the reception of the correspondingly threaded cap or closure member 32. A shoulder as 33 is provided on said member 28, forming the periphery of the opening 34, and adapted to receive the spacer 35, which is arranged between the shoulder 33 and the edge 36 of the cap 32.

It will be seen that the conical screen 37 may be removably held in place between the spacer 35 and the shoulder 33 by tightening the cap 32 to force said spacer against the flat peripheral edge 38 of said screen, and that the screen may easily be removed for cleaning or replacement by loosening the cap 32 and allowing the spacer 35 and the screen to drop through the opening 19.

For allowing the hot gases to mix with the fuel mixture so as to heat said mixture at a second stage, just before the mixture enters the manifold 17, I provide a series of openings 40 in the flange 23 of the cover, said openings being covered by a suitable guard or screen 41 to prevent flame passing into the passage 21, but without material obstruction of the draft. The partition wall 39 carries a series of vanes 42 extending inwardly into the combustion chamber 20 and a similar series of vanes 43 extending outwardly into the passage 21 for the purpose of promoting turbulence of the mixture by producing a whirling flow therein as the mixture passes from the inlet 19 to the outlet 18. The vanes 42 are heated by the burning fuel in the combustion chamber 20 and promote the heat transfer from the burning gas in said chamber to the wall 39 and therefrom and through the vanes 43, transfer the heat to the fuel mixture. As will be seen from Fig. 1, the comparatively cool gas passing through the inlet 19 must pass over the heated surfaces of the vanes 43 as well as the wall 39 and the direction of flow of the mixture is changed by the inclined vanes so that the gases are given a swirling motion. There is, however, a smooth flow of gas over the heated walls and vanes by reason of the tapered shape of the ends of the chamber and of the wall 39. The interposition of said chamber in the gas stream entering through the opening 19 does not have any throttling action or reduce the velocity of the stream such as might slow up engine speed, since the area of cross-section of the passage 21 is made greater than that of the opening 19.

While I have shown only one set of vanes 42 and 43, it is evident that two or more of such sets may be employed, the axes of inclination of one set being opposed to that of the other set, so that the gases are given opposed swirling motions and a greater degree of turbulence and an even more intimate mixture of gases both inside and outside of the burning chamber attained, particularly, where a comparatively long or high combustion chamber is required. It will further be seen that the vanes 43 serve to space the wall 39 from the casing 10 and aid in maintaining the combustion chamber wall and the parts connected thereto in place, as well as transferring heat from the chamber to the passage 21.

For the purpose of admitting air into the fuel to be ignited in the combustion chamber 20 and for the further purpose of diverting a portion of the fuel thereinto, I provide the vane 44, substantially semi-circular in cross-section, and projecting outwardly from the tapered member 28 into the annular passage 21. Concentrically with and just below said vane, I arrange the threaded adjustable hollow needle 45, said needle being threaded as at 46 to the casing 10. Said needle is preferably threaded externally to allow the adjustment thereof, but at its inner end, the needle is tapered as at 48 to cooperate with the correspondingly tapered passage 49 to provide an adjustable fuel inlet passage into the lower portion 50 of the combustion chamber.

It will be seen that part of the fuel mixture entering the passage 21 through the opening 19 strikes the vane 44 and is thereby diverted through the adjustable passage 49 into the compartment 50. In the chamber portion 50, I prefer to provide another inclined vane as 51, preferably extending upwardly and inwardly from the spacer 35, adjacent the end 48 of the hollow needle.

As the engine is operated, the suction created in the combustion chamber 20 and the compartment thereof, causes air to be drawn through the opening 52 of the adjusting needle, as well as causing the diverted fuel to be drawn through the passage 49. The air and fuel thus drawn into the compartment 50 is diverted upwardly by the vane 51, passes through the screen 37, is agitated by the vanes 52 and is then ignited by the spark plug 53 secured to the cover 12 of the combustion chamber. Since the suction within the combustion chamber is the same as that in the fuel passage 21, the heated products of combustion are drawn through the openings 40 past the screen 41 into the fuel just before it enters the manifold pipe 17 to heat the fuel mixture.

The cover 12 also carries the auxiliary air valve 60 for supplying additional air to the heated fuel mixture just before it enters the manifold 17. Said valve 60 may be so regulated as to admit the desired amount of air under the desired conditions, as by means of the adjusting nut 61 at the end of the valve stem 62. The head 63 of the valve is normally maintained against its seat 64 by means of the spring 65 interposed between the cap 66 and the valve stem bearing 67.

Priming means for simultaneously injecting a priming fluid of relatively high volatility into the combustion chamber and into the manifold above the throttle is provided, in accordance with the method shown and described in my co-pending applications for patents hereinbefore mentioned. Said priming means consists of a suitable pump, not shown, operatively connected to the inlet pipe 70 secured to the cap 12, which pipe communicates with the upper end of the passage 21 and with the manifold 17. The pump is further operatively connected to the priming fluid inlet pipe 71 secured to the casing 10 and communicating with the interior of the combustion chamber as by means of the opening 72 in the wall 26.

I prefer to arrange a suitable pipe 73 in the opening 72, upwardly and inwardly inclined toward the spark plug 53, whereby a spray of priming fluid may be delivered adjacent to the ignition points of the plug to allow quick starting and quick heating.

It is intended that the priming means operate simultaneously with the cranking of the engine, so that a jet of priming fluid is injected simultaneously into the combustion chamber adjacent the spark plug and into the manifold. As the engine is cranked, suction is created in the passage 21 and in the combustion chamber whereby the fuel mixture leaving the carburetor and entering the passage 21 through the inlet 19, is quickly heated at one stage by the vanes 43 and the wall 39 due to the immediate ignition of the priming fluid injected into the combustion chamber, and at a second stage by the entry into the fuel mixture of hot gases through the openings 40.

At the same time, a portion of the fuel mixture entering through the opening 19, is diverted by the vanes 44 into the passage 49, and is there mixed with air entering the opening 52 of the hollow needle, the mixture of diverted fuel and air being directed upwardly through the screen 37 and into the combustion chamber where it is ignited by the spark plug. The fuel mixture heated as above described at two stages, is drawn through the opening 18 into the manifold pipe, and thence to the engine cylinders, being first mixed with air passing through the air valve 60 when the valve head 63 is depressed against the action of the spring 65 by the engine suction.

It will be seen that the combustion chamber functions as soon as the engine is started and that while the combustion chamber becomes heated rapidly, the incoming mixture is further warmed by the products of the combustion leaving the combustion chamber through the holes 40.

Furthermore, the combustion chamber wall 39 and the vanes 42 and 43 being of comparatively thin material, become rapidly heated and serve efficiently to heat and vaporize the mixture leaving the carburetor. It will be obvious that the quantity of mixture passing into the manifold depends on the carburetor throttle opening which is not shown but in a manner which is well understood.

It will be seen that I have provided a simple and efficient preheating and mixing device constructed of a minimum number of parts adapted to be quickly disassembled for inspection, cleaning and repair, and well adapted to meet the severe requirements of practical use.

While I have shown and described a specific embodiment of my invention, I do not wish to be understood as limiting myself thereto but intend to claim my invention as broadly as may be permitted by the state of the prior art and the terms of the appended claims.

I claim:

1. In apparatus of the character described, a casing having a fuel inlet at one end thereof and having a removable cover at the other end thereof, a perforated flange depending from said cover, a screen arranged about the perforations of said flange, an annular wall tapered at its upper end removably secured to said flange and dividing the casing into a fuel passage on the outside thereof, and a combustion chamber on the inside thereof, a tapered closure for the lower end of said wall, said closure having a fuel and air inlet opening therein, a hollow needle adjustably mounted in said casing for adjusting the effective size of said opening, an arcuate vane in the fuel passage about said hollow needle for diverting toward said opening, fuel entering said casing fuel inlet, an engine intake manifold associated with said casing and communicating with said fuel passage, inclined vanes projecting from said wall inwardly into said combustion chamber and outwardly into said fuel passage, an auxiliary air valve in said fuel passage, priming means for simultaneously injecting priming fluid into the combustion chamber and into the fuel passage, and electrical ignition means carried by said cover and extending into said combustion chamber.

2. In apparatus of the character described, a casing, a flange at the lower end of the casing having an opening therein for the admission of fuel mixture into said casing and adapted to be secured to the outlet of a carburetor, a removable cover for the other end of said casing, a wall arranged concentrically of and inside of said casing and removably secured to said cover for providing an outer passage for fuel and air communicating with the opening in the flange and providing a combustion chamber in the interior of said wall, means for diverting a portion of the fuel mixture from said passage into the interior of said chamber, means for igniting said diverted portion of the fuel for heating said wall and thereby heating the mixture in said passage, inclined vanes on said wall for agitating the fuel mixture during the movement thereof, for agitating the fuel in the combustion chamber, and for conducting heat from the combustion chamber to said wall, and a closure for the lower end of the combustion chamber arranged below said fuel diverting means.

3. In apparatus of the character described, a casing, a cover for one end of the casing, an annular wall suspended from the cover for dividing the casing into an outer compartment and an inner combustion compartment, said casing having an opening at the other end thereof for the admission of fuel mixture which opening communicates with the outer compartment, means for diverting a portion of the fuel mixture from the outer compartment into the combustion compartment and for igniting said portion for supplying heat to the mixture, said compartments communicating at the upper ends thereof for permitting the hot gases to pass from the inner compartment into the outer compartment, and means for injecting priming fluid into both of said compartments.

4. In apparatus of the character described, a casing having an inner combustion compartment and an outer fuel compartment communicating with a fuel inlet at one end of the casing, said compartments communicating with each other at the upper ends thereof, a closure for the lower end of the combustion compartment, said closure having an opening therein for the admission of fuel into said combustion compartment, means for adjusting said closure opening and for admitting air into said combustion compartment, and a vane in said outer compartment adjacent said adjusting means for diverting fuel from said outer compartment toward said closure opening and into the combustion compartment.

5. In apparatus of the character described, a casing having an opening at one end and having a removable cover at the other end, an annular wall suspended from said cover and dividing the casing into an outer fuel compartment communicating with said opening and an inner combustion compartment, adjustable means for diverting fuel from the outer compartment into the combustion compartment and ignition means carried by said cover and extending into said combustion compartment.

6. In apparatus of the character described, a casing having an opening at one end and having a removable cover at the other end, an annular wall suspended from said cover and dividing the casing into an outer fuel compartment communicating with said opening and an inner combustion compartment, adjustable means for diverting fuel from the outer compartment into the combustion compartment, ignition means carried by said cover and extending into such combustion compartment, and vanes extending from said wall into both of said compartments.

7. In apparatus of the character described, a casing closed at one end thereof and open at the other end, an annular wall in said casing dividing the casing into an inner and an outer compartment, said outer compartment communicating with the open end of said casing, means for diverting fuel entering the outer compartment into said inner compartment, and inclined vanes projecting from said wall into said inner and outer compartments.

8. In apparatus of the character described, a casing closed at one end, having an inlet opening at the other end, and having a side outlet opening therein, a wall in said casing dividing the interior of the casing into two substantially concentric compartments, one of said compartments communicating with the open end of the casing and with said outlet opening, adjustable means in said last-mentioned compartment for diverting fuel entering said compartment into the other compartment, and ignition means in said other compartment.

9. In apparatus of the character described, a casing having a fuel inlet opening at one end thereof and having an outlet opening therein, a removable cover at the other end, an annular wall removably secured to the cover, and dividing the casing into a fuel compartment and a combustion compartment, and vanes on said wall projecting into both of said compartments and serving to space the wall from the casing and to transfer heat from the combustion compartment to the fuel compartment.

10. In apparatus of the character described, a casing having a fuel inlet opening at one end and a second opening for the outlet of heated fuel, an annular wall in the casing dividing the casing into a fuel compartment communicating with said outlet opening and a combustion compartment, and an engine manifold associated with said casing and communicating with said outlet opening.

11. In apparatus of the character described, a casing, a wall in said casing dividing the casing into a fuel compartment and a combustion compartment, a hollow needle communicating with the combustion compartment, and means adjacent the needle for diverting material from the fuel compartment past the needle into the combustion compartment.

12. In apparatus of the character described, a casing, means for dividing the casing into an inner substantially closed compartment and an outer compartment open at one end thereof for the admission of fuel thereinto, said compartments communicating through screened openings at the upper ends thereof, adjustable means for diverting fuel from the outer compartment and for admitting air and the diverted fuel into the inner compartment, vanes in said compartments for agitating material passing thereby, ignition means in the inner compartment, and means for injecting priming fluid into both of said compartments.

13. In apparatus of the character described, a casing, an annular wall removably mounted within said casing, a perforated upper end on said wall providing a passage communicating with both sides of said wall, a fire screen covering said passage, a closure for the lower end of said wall, said closure having an opening therein communicating with the outside of said wall, and adjustable means for regulating the size of said closure opening.

14. In apparatus of the character described, a casing, a manifold communicating with said casing, an annular fuel passage in the casing, an interior substantially closed combustion chamber in said casing arranged inside of the fuel passage and communicating through guarded openings with said passage and said manifold, ignition means in said combustion chamber, fuel supplying means for said combustion chamber, and gas agitating means in the chamber and in the passage and conducting heat therebetween.

15. In apparatus of the character described, a casing open at one end thereof for the admission thereinto of fuel mixture and having an outlet opening therein, a cover for the other end of said casing, an engine intake manifold between said ends and communicating with said outlet opening, an annular wall in and spaced from the inside wall of the casing, providing an interior combustion compartment closed off from said inlet opening, means for diverting material from the outside of said wall into said combustion chamber, ignition means in said combustion chamber, and heat transfer and gas agitating means on said wall.

16. In apparatus of the character described, a casing having a fuel inlet opening at one end thereof, a removable cover at the other end thereof, an annular wall suspended from said cover and arranged interiorly of and in spaced relation to the inner wall of the casing and thereby dividing the casing into an outer compartment communicating with said inlet opening and an inner compartment, a closure for the lower end of said wall, said closure having an opening therein communicating with said outer compartment, an adjustable hollow needle for adjusting the size of said closure opening, means in said outer compartment for diverting fuel through the closure opening into the inner compartment, and ignition means in said inner compartment.

17. In apparatus of the character described, a casing, a removable cover for one end of the casing, an annular depending perforated flange on said cover, a flange having an opening therein at the other end of said casing adapted to be removably secured to the outlet of a carburetor, a tapered annular wall removably secured to said depending flange and dividing the casing into a pair of concentric compartments, a tapered closure for the lower end of said wall having an opening therein communicating with the outer compartment, adjustable means for regulating the size of said closure opening, means for diverting material from the outer compartment through the closure opening and into the inner compartment, and ignition means in the inner compartment.

18. In apparatus of the character described, a casing, an annular wall within the casing dividing the casing into an inner combustion chamber and an outer fuel passage, conduits for leading priming fluid into said chamber and said passage, igniting means in the combustion chamber, and means for receiving and transferring heat from the combustion chamber to the fuel passage.

19. In apparatus of the character described, a casing having an inner and an outer compartment therein, a vane in the outer compartment for diverting material from the outer to the inner compartment, igniting means in the inner compartment and heat transfer means in the inner and the outer compartments.

20. In apparatus of the character described, an annular wall having a shoulder near the lower end thereof, a closure member threaded to the lower end of said wall and in spaced relation to said shoulder, a hollow spacer member between the closure member and said shoulder, and a screen between the upper end of said spacer member and said shoulder, said screen being secured in place by pressure exerted by the spacer member when the closure member is tightened against said spacer member.

21. In apparatus of the character described, a casing having an inner and an outer compartment therein, said compartments communicating at their lower ends through a tapered opening, a closure member closing the lower end of the inner compartment below the tapered opening, a vane in the outer compartment above the tapered opening, and means insertable into said tapered opening for adjusting the effective size of the tapered opening and for conducting the air from the outside of the casing to the inner compartment.

22. In apparatus of the character described, a casing having a fuel inlet opening at one end thereof, a removable cover at the other end thereof, an annular wall suspended from said cover and arranged in spaced relation to the inner wall of the casing to divide the casing into an outer compartment communicating with said opening and an inner compartment, a conduit for priming fluid secured to the casing and projecting through the outer compartment and entering the inner compartment and a second conduit for priming fuel secured to the cover and communicating with the outer compartment, said cover and said wall being removable as a unit from the casing on the disconnection of the first-mentioned priming conduit from the casing.

23. In apparatus of the character described, a casing, a removable cover for one end of the casing, an annular wall secured to and depending from the cover and dividing the casing into an inner and an outer compartment, a closure for the lower end of the wall having an opening communicating with the outer compartment, adjustable means for regulating the size of the adjustable opening, and means for directing fuel from one compartment through the closure opening and into the other compartment, said cover and said wall being removable from the casing as a unit on the removal of the adjusting means from the opening.

24. In apparatus of the character described, a casing open at one end, an annular wall in the casing dividing the casing into an inner compartment and an outer compartment, said outer compartment communicating with the open end of the casing and adapted to communicate with an engine manifold, adjustable means for diverting fuel entering the outer compartment into the inner compartment and vanes extending from said wall into both of said compartments.

25. In apparatus of the character described, a casing, a wall in said casing dividing the casing into an outer fuel passage and an inner combustion chamber, a hollow closure having a fuel inlet for the lower end of the combustion chamber, means for diverting a portion of the fuel from the fuel passage into the closure, and a screen between the fuel inlet into said closure and the remainder of the combustion chamber for preventing ignition of the mixture entering the closure.

GIUSEPPE GARIBALDI.